March 29, 1932.  W. R. MORRIS  1,851,680
HYDRAULIC WATER MOTOR
Filed June 23, 1930  3 Sheets-Sheet 1
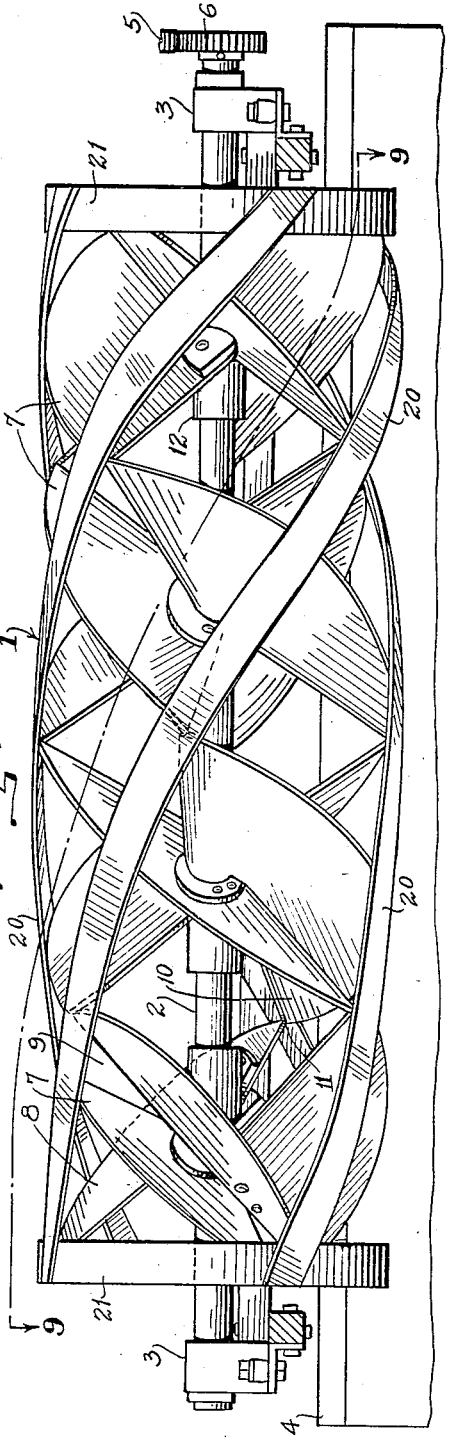
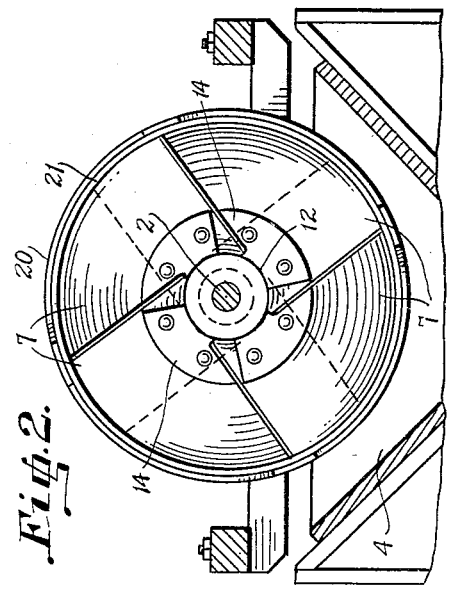
Inventor
William R. Morris
By Mason Fenwick Lawrence
Attorneys March 29, 1932. W. R. MORRIS 1,851,680
HYDRAULIC WATER MOTOR
Filed June 23, 1930 3 Sheets-Sheet 2

Inventor
William R. Morris
By Mason Fenwick Lawrence
Attorneys

March 29, 1932. W. R. MORRIS 1,851,680
HYDRAULIC WATER MOTOR
Filed June 23, 1930 3 Sheets-Sheet 3
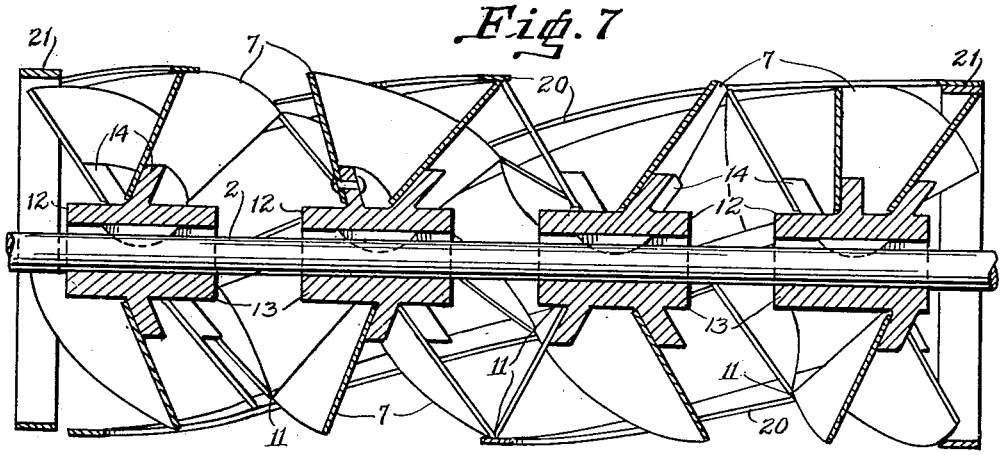
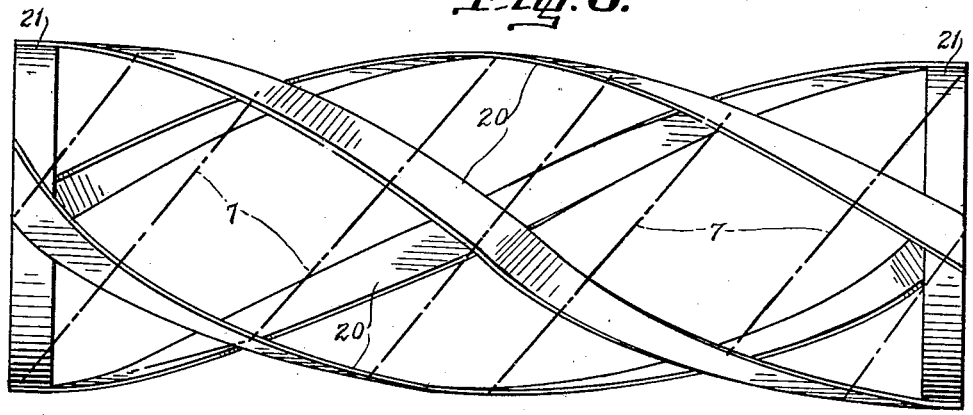
Inventor
William R. Morris Patented Mar. 29, 1932　　　　　　　　　　　　　　　　　　　　1,851,680

UNITED STATES PATENT OFFICE

WILLIAM R. MORRIS, OF BOISE, IDAHO, ASSIGNOR OF ONE-HALF TO ROBERT H. MORRIS AND ONE-HALF TO RAYMOND G. MORRIS, BOTH OF BOISE, IDAHO

HYDRAULIC WATER MOTOR

Application filed June 23, 1930. Serial No. 463,326.

This invention relates to hydraulic motors and proposes a novel construction of water wheel in which the efficiency of the energy transmutation is enhanced, the strength increased and the construction simplified.

One of the more specific objects of the invention is the provision of a water wheel in which the vanes follow one another spirally around a central shaft or axis, the disposition of the vanes being such however, that they do not form a continuous or true spiral, since the vanes are constituted by sector-shaped blades, the surfaces of which are flat, the vanes being inclined at an angle to one another thus providing a free drop for the motive fluid in descending from one vane to another, thus maintaining the maximum velocity of flow of the motive fluid throughout the longitudinal extent of the motor by providing for the escape of part of the water through the spaces between adjacent vanes on to a corresponding vane of an adjacent series.

In water wheels with continuous spiral vanes, and especially such wheels as revolve in a casing, it is common for the velocity of the water to be checked due to insufficient capacity of the water wheel, so that the after end of the water wheel, that is to say, the end toward the discharge, may act as a pump, tending to attenuate the water within the wheel and drawing in laterally such water surrounding the water wheel to which it may have access. It is of course, apparent that the efficiency of the water wheel is decreased proportionately to the extent of that part which is not acting as a motor but instead, tending to act as a pump.

In the present construction, providing the vanes in discontinuous units affords two paths of discharge for the water falling from the edge of each vane, so that the water wheel as a whole, passes water more freely and with minimum non-useful diminution in its velocity.

Another object of the invention is the provision of a system of spiral bracing oppositely inclined to the direction of slope of the vanes and secured thereto alternately, in the longitudinal direction of the water wheel, first to the adjoining ends of two vanes in one group and then to an intermediate portion of the periphery of a vane in the adjacent group, for rigidly securing the vanes, and reinforcing the wheel as a whole.

Still another object of the invention is the mounting of the vanes at such angles that radial elements of the successive vanes lying in a radial plane extending longitudinally half-way between adjacent members of the parallel bracing, extend zigzag fashion, thus increasing the rigidity of the entire fabrication.

Still another object of the invention is the construction of the axial boss or collar to which the vanes of the group in each zone are attached.

Other objects of the invention will appear as the following description of a preferred embodiment of my invention proceeds.

In the drawings:

Figure 1 is a side elevation of a water motor installation including the water wheel of the present invention;

Figure 2 is a top plan view of the water wheel;

Figure 3 is a plan view of one of the vanes;

Figure 7 is a longitudinal section of a portion of the water wheel; and

Figure 8 is a diagrammatic illustration of the peripheral bracing.

Figure 4:
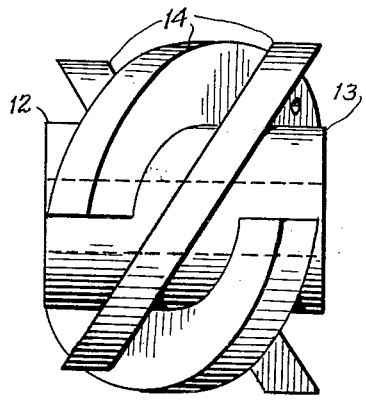
Figure 4 is a side elevation of the hub.

Referring now in detail to the several figures in which similar characters of reference are used throughout the several views to denote identical parts, the numeral 1 represents in general, a water wheel constructed to follow the principles of the invention. This water wheel is rigid with a shaft 2 which runs in bearings 3, the whole being mounted in a trough or sluice 4 in a moving current of water. Power is taken off from the shaft 2 of the water motor by means such as the meshing gears 5 and 6. In the embodiment shown, the water wheel is mounted so as to be impinged by a horizontally moving water current such as is found in open streams.

The device is equally well adapted to being mounted vertically and subjected to the force of a suitable head of water for instance, a waterfall.

It is usual to construct water wheels with a set or series of spirally arranged vanes extending for the length of the shaft such vanes being substantially parallel to one another throughout the length of the water wheel. Such water wheels provide spiral conduits for the water, and when used in cylindrical casings as is customary, the spiral vanes and the walls of the casing form closed and constricted water passages. Water impinges upon the forward portions of such water wheels when moving at its maximum velocity, but since the said water passages are too restricted to accommodate the capacity flow of water therethrough, a differential velocity is produced, the velocity being greatest at the forward end of the water wheel and least at its after end. This has the effect as has been stated generally in the objects of the invention, of causing the water wheel in its after portion to turn the water rather than the water turn the motor. Such action produces a condition of attenuation in the after part of the water wheel, the latter ceasing to function as a motor and assuming the rôle of a pump, entraining water from regions lateral with respect to the water wheel. The efficiency of the water wheel as a motor is diminished proportionately to the extent of the part which acts as a pump.

I have found by the exercise of the present invention that by making the spiral water conduit from one end of the water wheel to the other discontinuous, and providing alternative paths of flow and discharge, the water passes more freely through the apparatus, its velocity remaining unchecked except to such extent as is useful in transmuting the velocity of the flow to rotary movement of the water wheel.

In order to accomplish this result, a plurality of individual vanes 7 are provided, each being perfectly flat. In order to arrange such vanes in a spiral series surrounding the central shaft 2, they are inclined at an angle as shown. Water flowing down the inclined flat surface of one vane makes a leap before it impinges upon the next vane. In the course of its leap it is free to move in one of two directions, either directly upon the surface of the next lower vane 8 of the same series, or through the open space 9 on to the vane 10 of the adjacent series. There is thus less chance of the water current becoming throttled in its passage between the vanes and consequently, a freer flow of water is possible throughout the longitudinal extent of the water wheel. This causes the velocity drop to be less abrupt than that in the case of the ordinary spiral motor and consequently, averts the defect of the after part of the motor being relatively unsupplied with water as fast as it can be utilized for its motive function, and prevents any part of the water wheel functioning as a pump.

Figure 5:
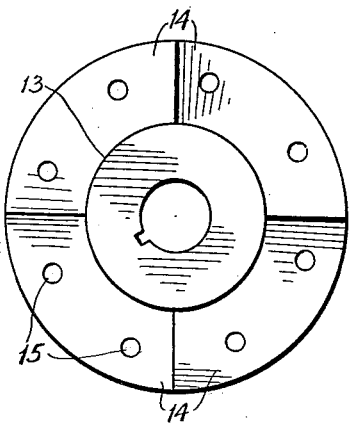
Figure 5 is an end elevation of the hub.
Figure 6:
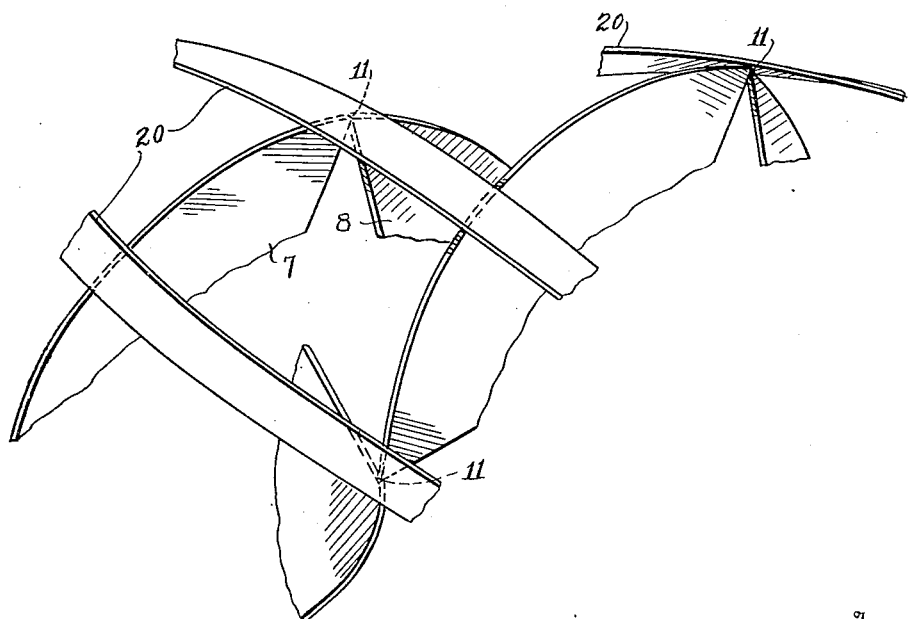
Figure 6 is a detail showing the nature of the connection between adjacent vanes.

The construction of a water wheel made according to the principles of the present invention is greatly simplified, since it is quite a simple matter to stamp out a plurality of the sector-shaped vane units 7 as shown in Figure 5 and to secure these in their proper inclined positions relative to the shaft 2.

It will be noted that in the distribution of the vanes, they are clustered around the shaft in a longitudinal series of zones. There are as many clustered in each zone as there are series of vanes. In the present illustrative embodiment of the invention, there are four series of vanes. This number is not important and the invention may be as well carried out with merely one series of vanes or a great many.

There are as many zones provided as may be desirable, and the length of the water wheel of course, has its limits in practice. The vanes of each series are arranged spirally about the shaft 2, the vanes being angularly inclined as above stated and secured together at their adjacent outer ends as shown at 11. The central portion of the cluster of vanes in each zone is constituted by a hub or boss 12 to which the vanes are rigidly secured.

This hub as will be seen in Figures 4 and 5, is constituted by a central cylindrical portion 13 adapted to be keyed or otherwise suitably fixed to the shaft 2 and having inclined flanges 14 extending from its periphery. Said flanges extend through an arc, the length of which is determined by the number of series of vanes in the group which the hub is designed to support. If there are two series of vanes, each flange may extend through an arc of 180°; if there are a greater number of series, the value of the arcuate extent of the flanges will be less, but in general for the sake of strength, it is preferred that the flanges be of such length as to over-lie one another.

A feature which distinguishes the hub 12 is the fact that the faces of the flanges which the vanes engage are flat instead of being spiral as might be expected. The flanges are provided with an appropriate number of bolt holes 15, by means of which the vanes may be secured to the hub.

Riveting or welding may be resorted to as alternative means for attaching the vanes to the flanges.

The vanes are braced by spirally arranged strips or bands 20 which are suitably united to the juncture of two vanes in the same series and to an intermediate edge portion of the vane in the next series and so on alternately throughout the length of the water wheel.

The spiral strips or bands are arranged at intervals peripherally of the water wheel and secured at their ends to circular bounding rings 21 at the fore and aft ends thereof. Since the vanes are flat, the edges of the vanes cooperate with the bracing members 20 to form the entire water wheel into a lattice girder of maximum strength. If the vanes were curved, a capacity to bend would be imparted to them so that the strength of the said girder would be seriously impaired.

It will be observed from Figure 1 that the vanes of adjacent series are arranged in staggered relation, that is to say, the meeting point of two vanes is beneath an intermediate portion of an over-lying vane of the adjacent series. Since two vanes which meet are inclined at an angle, the two vanes will bear a different angular relationship with respect to the plane of the adjacent over-lying vane. The result of this relationship is that the cross section of the water course through the water wheel defined between the spiral band 20, the axis of the wheel and two blades united intermediately by said spiral band and of which the leading and trailing edges of the intervening meeting blades form struts, will be maintained in a shape which is non-parallelogrammatic and consequently will not be subject to distortion.

Numerals 18 and 19 represent radial elements of the other of the meeting pair of vanes and the same over-lying vane taken in a plane which parallels the diagonal bracing, and it will be observed that these elements diverge toward the axis of the water wheel continuing spirally throughout the length of the water wheel in a plane intermediate any two of the strips of the diagonal bracing. It will be noted therefore, that the radial elements of the vanes of the several series alternately converge and diverge toward the axis of the water wheel. This zigzag arrangement of the vanes, avoids the formation of parallelogram cross sections in the water conduits between adjacent series of vanes and the shaft and diagonal bracing and thus tends to increase the rigidity and resistance to distortion of the water wheel. In ordinary construction, the continuous spiral vanes are parallel so that inherent bracing against distortion does not exist except such as is inherent in the metal itself.

It will be understood that the spiral strips or bands 20 may be supplanted by an entire casing enclosing the vanes and if the casing is secured to the bands at points corresponding to the points of union of the spiral strips or bands with said vanes, the casing may be considered the full equivalent of said strips or bands since they are nothing more than the residual parts of a casing, the rest of which has been cut away.

It is essential however, in order to carry out fully the principles of the invention that the spiral bracing shall be secured to the vanes alternately at the points of union of two vanes in a series and the intermediate peripheral edge of a vane in the adjacent series.

It is understood that the power take-off as shown, is elemental and merely illustrative of one application of the invention and that it is contemplated that the water wheel may be used in any relation whatsover to a driven mechanism.

What I claim is:

1. Hydraulic motor comprising an axle and a plurality of vanes spirally disposed about said axle, said vanes each comprising a series of flat blades relatively angularly disposed, said blades being fixed with respect to said axle and connected at their adjacent peripheral corners, each blade terminating at its rear end in a substantially radial edge lying substantially in advance of the leading edge of the following blade of the same vane, defining a space between said blades, the vanes being so angularly displaced that axial planes embracing the edges of the blade of one series, intersect intermediate parts of the blades of the adjacent series, and a spirally arranged reinforcing band wound in a direction opposite to that of the vanes.

2. Hydraulic motor comprising an axle and a plurality of vanes spirally disposed about said axle, each vane comprising a series of flat inclined blades relatively angularly disposed, fixed with respect to said axle and united at their adjacent corners, the vanes being so angularly displaced that the meeting point of the corners of two blades in one series lies in an axial plane intersecting the intermediate parts of blades in previous and following series adjacent to said first named series, a spirally arranged reinforcing band wound in a direction opposite to that of the vanes, uniting the meeting points of the blades of said series, and an intermediate point on the edges of the blades in said previous and following adjacent series, the leading and trailing edges of the said meeting blades acting as diagonal struts with respect to the cross section defined by the axis of the water wheel, the spiral band, and the said blades of said adjacent series, for maintaining the non-parallelogrammatic shape of said cross section.

In testimony whereof I affix my signature.

WILLIAM R. MORRIS.